Figure 1:
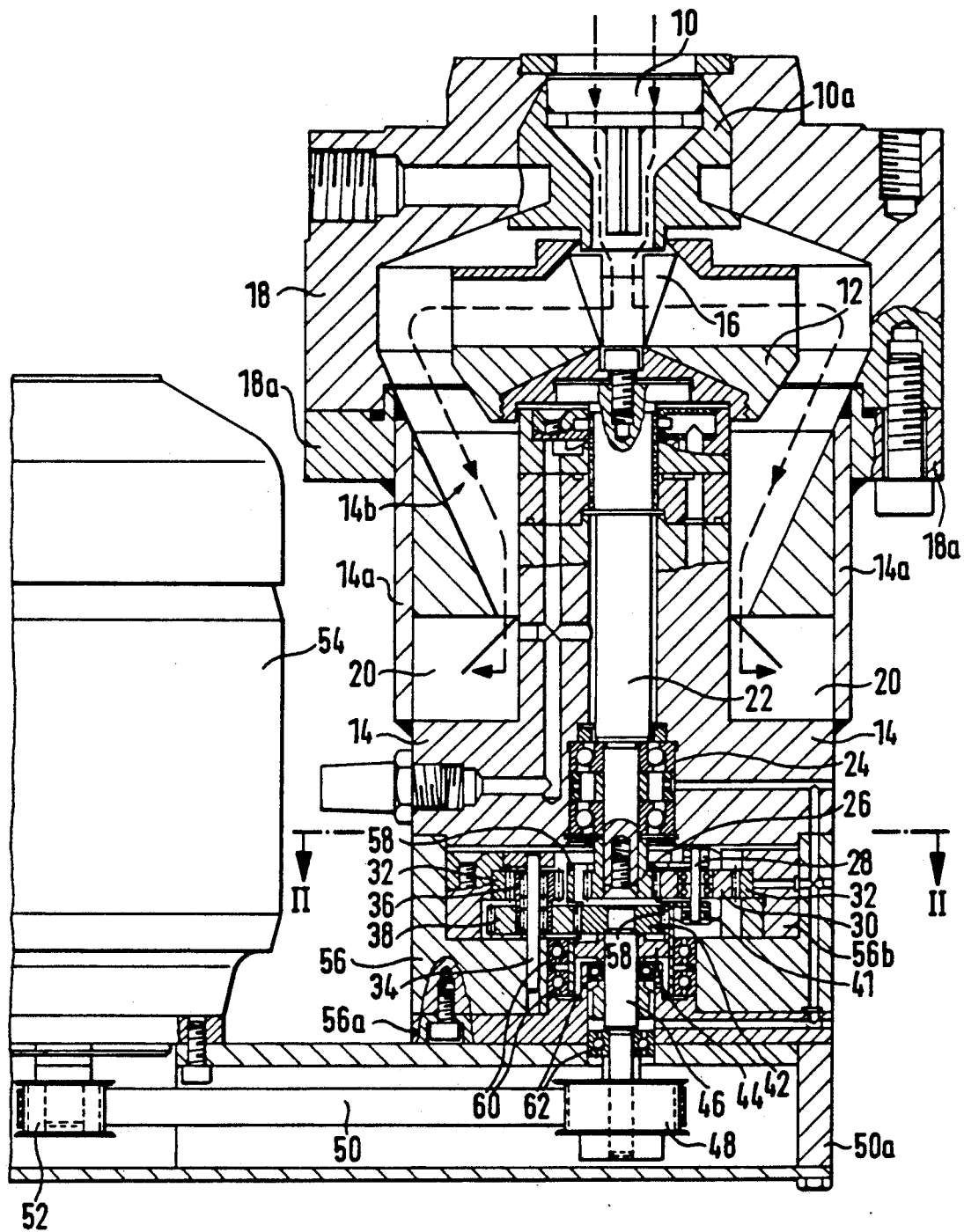

United States Patent
Fassbinder

Patent Number: 5,088,331
Date of Patent: Feb. 18, 1992

[54] APPARATUS FOR MEASURING A MASS STREAM

[75] Inventor: Hans-Georg Fassbinder, Sulzbach-Rosenberg, Fed. Rep. of Germany

[73] Assignee: CRA Services Limited, Melbourne, Australia

[21] Appl. No.: 620,107

[22] Filed: Nov. 30, 1990

[30] Foreign Application Priority Data

Dec. 8, 1989 [DE] Fed. Rep. of Germany ....... 3940576

[51] Int. Cl.$^5$ .............................................. G01F 1/82
[52] U.S. Cl. .................................................. 73/861.37
[58] Field of Search ............. 73/861.36, 861.37, 861.38

[56] References Cited

U.S. PATENT DOCUMENTS

| | | | |
|---|---|---|---|
| 2,775,125 | 12/1956 | Peaceman | 73/861.38 |
| 4,700,578 | 10/1987 | Fassbinder | 73/861.37 |

*Primary Examiner*—Herbert Goldstein
*Attorney, Agent, or Firm*—Armstrong, Nikaido, Marmelstein, Kubovcik & Murray

[57] ABSTRACT

For measuring a preferably heterogeneous mass stream there is a class of measuring apparatus that uses a rotary member carried by a shaft and driven at constant speed, said rotary member deflecting radially the mass stream acting axially upon the rotary member, thereby giving it a tangential velocity component. The torque dependent on the mass stream is measured on the shaft. For this purpose a first spur wheel is provided on the shaft, that meshes with a second spur wheel. The second spur wheel is mounted in a carrier member that is in turn mounted so as to rotate about the axis of the shaft and held in position by a forcesensing device. To improve the measuring sensitivity the second spur wheel has a second toothed engagement opposite the first spur wheel with an internal toothed wheel rim which is also mounted so as to rotate about the axis of the shaft and set rotating by a driving pinion. A rotational body set rotating in the same direction as the shaft is in frictional engagement with the carrier member and/or the first spur wheel. The strength of the hydrodynamic frictional engagement is coordinated in such a way that the moments of friction of the first and second spur wheels are compensated by the moment of friction of the frictional engagement.

5 Claims, 2 Drawing Sheets

APPARATUS FOR MEASURING A MASS STREAM

The present invention relates to an apparatus known from German patent no. 35 07 993.

Chemical and metallurgical methods have recently been developed by which powdery or fine-grained substances are made to react in a continuous process with each other or with liquid or gaseous substances in a precisely defined stoichiometric relation. Some examples are the gasification of coal or the smelting reduction of iron ores. These methods make it necessary to coordinate the mass streams of several components with each other, which presupposes the measurement and regulation of these mass streams. A class of measuring apparatus is known for this purpose which is based on the principle of measuring that force which must be expended to impart a certain angular velocity or tangential velocity component on a mass stream flowing linearly through a pipe. The force required for this is directly proportional to the mass stream. The following relation holds:

$$Torque = k \times angular\ velocity \times mass\ stream.$$

Therefore, if the angular velocity is kept constant the mass stream is a linear function of the torque. The torque is measured in this class of measuring apparatus by guiding the mass stream axially onto a rotary member equipped with radially extending guide blades. The rotary member is driven by a synchronous motor at constant speed. The change in the driving torque is a direct measure of the fluctuations in the mass stream. The main problem is to measure the driving torque with sufficient precision. The shaft of the rotary member is naturally slowed down not only by the mass stream, but also by frictional forces. These frictional forces vary very greatly if there are fluctuations in temperature, since this changes the viscosity of the lubricants required for the shaft mounting.

To compensate these spurious torques it is known from German patent no. 35 07 993 to pivot the intermediate shaft of a driving spur gear for the rotary member, said intermediate shaft being disposed in a carrier member, about the driven shaft of the gearing coaxial to the rotary member, the swivel of the intermediate shaft or the carrier element being limited by a force-sensing device. The intermediate shaft bears a spur wheel with geometrical radius $R_2$ that meshes with a driven spur wheel (geometrical radius $R_1$) that drives the rotary member. The intermediate shaft also bears a spur wheel with geometrical radius $R_3$ that engages the pinion of the synchronous motor. The no-load moment of friction of the driven shaft has no influence on the measuring signal if the following condition is fulfilled:

$$\frac{R_3 - R_2}{R_1} = \frac{RM_Z}{RM_A}. \tag{1}$$

wherein $R_1$, $R_2$, $R_3$ are the geometrical radii of the gearwheels, $RM_Z$ is the moment of friction of the intermediate shaft, and $RM_A$ is the moment of friction of the driven shaft.

The driving torque $M_S$ then results as:

$$M_S = \left(\frac{R_3 - R_1}{R_3}\right) \cdot \left(\frac{R_1 + R_2}{R_1}\right) \cdot M_A, \tag{2}$$

wherein $M_A$ is the driven torque.

In Equation (2) the first parenthetical expression is necessarily smaller than 1 and in particular equal to 0.5. The second parenthetical expression is about equal to 2 in customary constructional designs, so that the driving torque is about equal to the driven torque. For very small driven torques corresponding to very small mass streams, the known measuring apparatus can no longer detect the likewise very small driving torque with sufficient precision.

The invention is based on the problem of improving a measuring apparatus of the type mentioned at the outset so as to ensure sufficient measuring accuracy even in the case of very small mass streams.

The invention is based on the idea of selecting the driving torque so as to be greater, in particular four times greater, than the driven torque so that the measuring sensitivity is improved by a factor of four over the prior art as in German patent no. 35 07 993. The measuring range of the known measuring apparatus of 5 to 50 kg/min can thus be improved in the inventive measuring apparatus to 1 to 10 kg/min.

Figure 2:
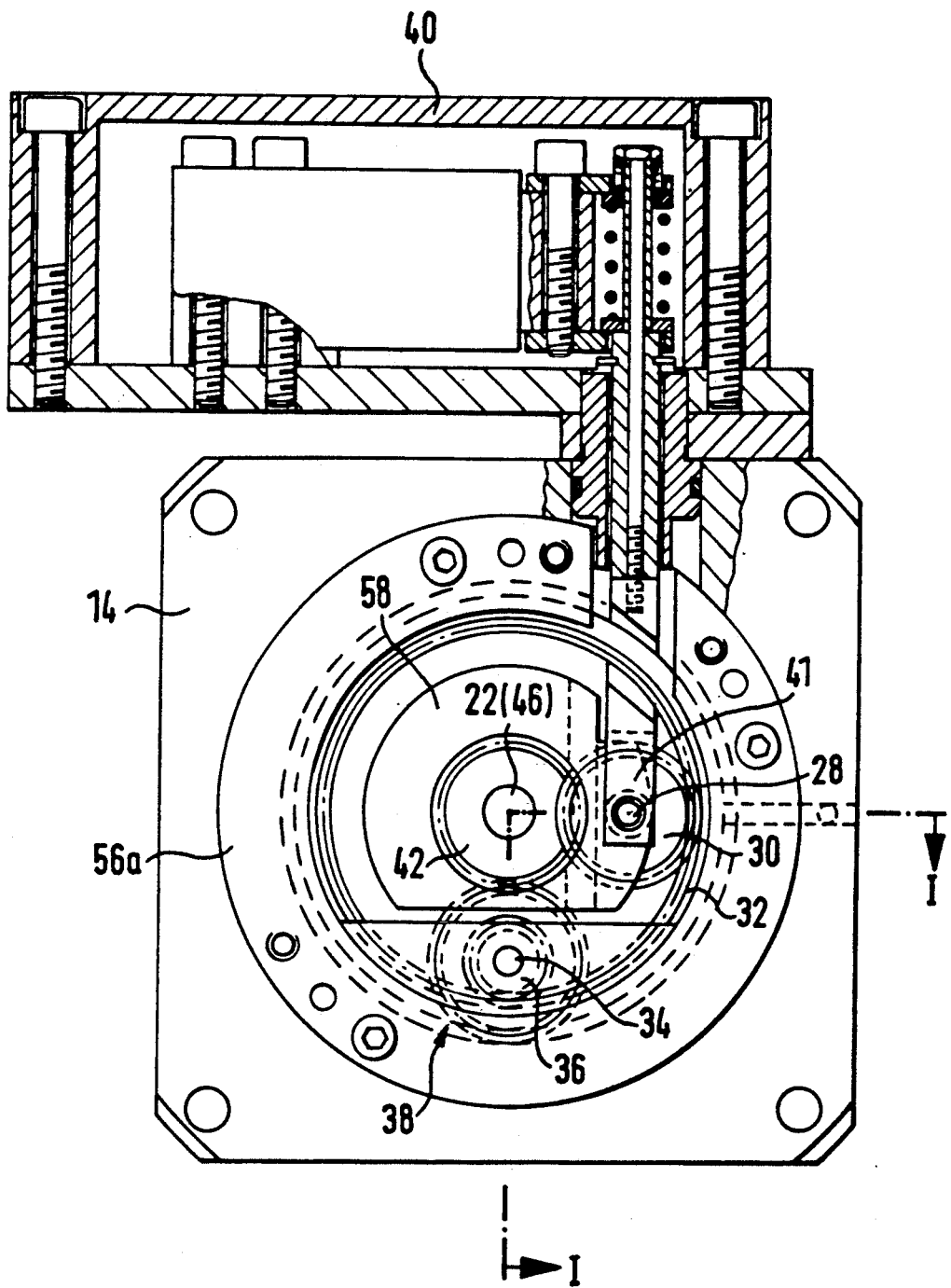

The invention shall be explained in more detail with reference to an exemplary embodiment shown in the drawings, in which FIG. 1 shows a longitudinal section through an exemplary embodiment of the inventive measuring apparatus, and FIG. 2 shows a cross section through the measuring apparatus of FIG. 1 along the line II—II, the course of the longitudinal section of FIG. 1 being indicated in the cross section of FIG. 2 along the bent line I—I.

The measuring apparatus shown in a longitudinal section in FIG. 1 has a rectangular housing portion 14 in which driving shaft 22 of a rotary member 12 designed as an impeller wheel is pivoted by means of rolling bearings 24. Rotary member 12 is mounted, for example screwed, on the upper axial end of driving shaft 22 so as to rotate therewith. Rotary member 12 is surrounded by a housing head 18 which is screwed sealingly onto an annular flange 18a. Annular flange 18a is connected, for example welded, on its inside to a ring 14a which is in turn slipped on rectangular housing portion 14 and connected, for example welded, thereto.

Housing head 18 has an axial mouth 10 for powdery or fine-grained substances which is funnel-shaped and formed by a coaxial inset 10a that fits into the top surface of housing head 18. Below the outlet of inset 10a there is the central feeding zone of rotary member 12, which consists of a horizontal rotary table fitted with guide blades 16. The mass stream of powdery or fine-grained substances acting upon rotary member 12 axially from above is deflected from its axial direction by guide blades 16 and given a tangential velocity component. Rotary member 12 has so many guide blades 16 that all mass particles, when leaving rotary member 12, possess an angular velocity corresponding to the driving speed of rotary member 12. The approximate path of movement of the particles through mouth 10 and rotary member 12 is indicated in FIG. 1 by dotted arrows. As one can see, the mass particles, after leaving rotary member 12, are deflected into a conical ring channel 14b which is rotationally symmetrical to the axis of driving shaft 22 within using head 18 and rectangular housing portion 14. Ring channel 14b opens into a horizontal ring channel 20 through which the mass stream leaves the measuring apparatus in a tangential direction with respect to the axis of driving shaft 22 or rotary member 12. The cross-sectional area of the outlet (not shown) of horizontal ring channel 20 corresponds at least to the cross-sectional area of axial mouth 10 for the mass stream.

Driving shaft 22 is driven by a synchronous motor 54 which is disposed parallel to the axis of rectangular housing portion 14 and drives a toothed belt 50 via its driven pulley 52. Toothed belt 50 lies on a driving pulley 48 which is in geared connection with driving shaft 22 in a way to be described in more detail below. This geared link is located within a gearbox 56 that is closed on its underside with a cover 56a and has its top fixed flush with the underside of rectangular housing portion 14. Cover 56a bears a toothed belt case 50a which holds synchronous motor 54.

Driving pulley 48 is connected, so as to rotate therewith, with a shaft 46 which is pivoted via two rolling bearings 62 in cover 56a of gearbox 56. Shaft 46 is disposed as an axial prolongation of driving shaft 22. The upper axial end of shaft 46 has a spur wheel 42 mounted thereon so as to rotate therewith which meshes with a spur wheel 38. Spur wheel 38 is mounted on a shaft 34 which is fixed with its lower end in gearbox 56 and with its upper end in a radial projection of a lining 56b of the inside wall of gearbox 56. Spur wheel 38 is connected in an axial prolongation with a pinion 36 so as to rotate therewith, said pinion meshing with an internal toothed wheel rim 32. Wheel rim 32 is inserted into a corresponding annular groove in lining 56b and rotates slidingly in this annular groove. Wheel rim 32 also meshes with a spur wheel 30, that is shown in FIG. 1 offset from pinion 36 by 180°. As indicated by the top view in FIG. 2 which shows line I—I in FIG. 1, spur wheel 30 is actually offset from pinion 36 only by 90° with respect to the axis of driving shaft 22 or shaft 46.

Spur wheel 30 is rotatably mounted on an intermediate shaft 28 by means of rolling bearings and meshes with a further spur wheel 26 which is rigidly connected with the lower end of driving shaft 22 and constitutes the driving spur wheel for shaft 22 or the driven spur wheel of the described geared link. Between driven spur wheel 26 and spur wheel 42 located therebelow there is a narrow radial gap which is filled with gear oil. Spur wheels 26 and 28 and wheel rim 32 are disposed on a common radial plane relative to the axis of driving shaft 22.

Intermediate shaft 28 is mounted at its two axial ends, so as to rotate therewith, in a carrier member 58 which has the sheath-like form apparent from FIG. 2. Carrier member 58 is mounted so as to be freely rotatable on the inside wall of gearbox 56 by means of two rolling bearings 60 and has on its surface area a segmental slot through which spur wheel 38 for the geared link with spur wheel 42 passes. At the place where intermediate shaft 28 is mounted in carrier member 58, carrier member 58 is provided with upper and lower flange-shaped extension arms between which spur wheel 30 rotates around intermediate shaft 28.

At the axial ends of intermediate shaft 28 the two limbs of a tongs-shaped measuring finger 41 are mounted, which can be seen well in the top view of FIG. 2. Measuring finger 41 leads to a force-sensing device 40 which is fixed on rectangular housing portion 14 of the measuring apparatus. If a mass stream of a certain size flows through the measuring apparatus, a torque of a certain size must be transmitted to maintain a certain constant angular velocity of rotary member 12. Carrier member 58, which is mounted virtually without friction with respect to gearbox 56, rotates under the effect of the reactive torque by a certain small angle that leads to a shift of measuring finger 41 of force-sensing device 40. The greater the shift of measuring finger 41, the greater is the counterforce provided and measured by force-sensing device 40, said counterforce being a direct measure of the mass stream passing through rotary member 12.

Below spur wheel 42, shaft 46 also has a rotational body 44 mounted thereon so as to rotate therewith, which extends radially as far as the inside wall of carrier element 58 surrounding it. The axial gap between rotational body 44 and the inside wall of carrier element 58 is filled with oil so as to establish a hydrodynamic frictional engagement between rotational body 44 and carrier member 58. There is a further hydrodynamic frictional engagement, as already mentioned, between rotational body 44, or spur wheel 42 thereabove, and driven spur wheel 26 via the radial gap between the two spur wheels 26 and 42. Rotational body 44 rotates in the same direction as shaft 46 and thus in the same direction as driving shaft 22, whereby the speed of shaft 46 is substantially greater than the speed of driving shaft 22. Instead of a frictional engagement between rotational body 44 and both carrier member 58 and spur wheel 26, one can alternatively provide only a frictional engagement between rotational body 44 and spur wheel 26 or between rotational body 44 and carrier member 58. Alternatively, it is also possible to have motor 54 drive, not shaft 46, but shaft 34 so that rotational body 44 is driven in shunt with driving shaft 22.

The oil feeding pipes to the shafts, rolling bearings and the wheel rim of the measuring apparatus are illustrated in detail in FIG. 1, which is a construction drawing, and need not be described further since this would not contribute to a better understanding of the invention.

The hydrodynamic frictional engagement via the gear oil filling between rotational body 44 and carrier member 58 and/or spur wheel 26 is coordinated in its strength in such a way that the moment of friction of rotational body 44 due to the rotation of rotational body 44 and driving shaft 22 in the same direction compensates the moments of friction of the driving shaft and intermediate shaft 28. If only one frictional engagement between rotational body 44 and driven shaft 22 is provided (whereby rotational body 44 rotates substantially faster than spur wheel 26), the following holds:

$$RM_{Rot} = \left(\frac{R_1 + R_2}{R_1}\right) \cdot RM_Z + RM_A \tag{3}$$

wherein $RM_{Rot}$ is the moment of friction of rotational body 44, $RM_A$ is the moment of friction of driven shaft 22, $RM_Z$ is the moment of friction of intermediate shaft 28, $R_1$ is the geometrical radius of driven spur wheel 26 on driving shaft 22 leading to rotary member 12, $R_2$ is the geometrical radius of spur wheel 30 on intermediate shaft 28 that meshes with driven spur wheel 26.

If only one frictional engagement between rotational body 44 and carrier member 58 is provided, the following holds:

$$RM_{Rot} = \left(\frac{R_1 + R_2}{R_1}\right) \cdot RM_Z + 2 \cdot \left(\frac{R_1 + R_2}{R_1}\right) \cdot RM_A \quad (4)$$

Due to the compensation of moments of friction $RM_A$ and $RM_Z$ the measured torque $M_S$ of carrier member 58 results as:

$$M_S = 2 \cdot \left(\frac{R_1 + R_2}{R_1}\right) \cdot M_A \quad (5)$$

wherein $M_A$ is the driven torque of shaft 22. Since the parenthetical expression in Equation (5) is equal to 2 with the customary constructional design, the driving torque is four times greater than the driven torque.

I claim:

1. An apparatus for measuring a preferably heterogeneous mass stream, having a rotary member (12) carried by a main shaft (22) and driven at constant speed, said rotary member deflecting radially the mass stream acting axially upon the rotary member, thereby giving it a tangential velocity component, whereby the torque dependent on the mass stream is measured on the main shaft (22), a first spur wheel (26) mounted on the main shaft (22) and meshing with a second spur wheel (30) mounted in a carrier member (58) that is in turn mounted so as to rotate about the axis of the main shaft (22) and held in position by a force-sensing device (40), and an internal toothed wheel rim (32) which is set rotating by a driving pinion (36) in geared connection with a drive motor (54) and in turn drives the second spur wheel (30), characterized in that the internal toothed wheel rim (32) is in toothed engagement with the second spur wheel (30), below the first spur wheel (26) a rotational body (44) is mounted, so as to rotate therewith, on an additional shaft (46) disposed as an axial prolongation of the main shaft (22), the additional shaft (46) being coupled with the drive motor (54) and having a substantially higher speed than the main shaft (22) in the same direction of rotation as the main shaft (22), and the rotational body (44) is connected via a hydrodynamic frictional engagement with the carrier member (58) and/or with the first spur wheel (26), the strength of the hydrodynamic frictional engagement being coordinated in such a way that the moments of friction of the first and second spur wheels (26, 30) are compensated by the moment of friction of the hydrodynamic frictional engagement.

2. The apparatus of claim 1, characterized in that the rotational body (44) extends radially as far as the inside wall of the carrier element (58) surrounding it, whereby the axial gap between the rotational body (44) and the inside wall of the carrier element (58) is filled with oil so as to establish a hydrodynamic frictional engagement between the rotational body (44) and the carrier member (58).

3. The apparatus of claim 1, characterized in that the rotational body (44) is in hydrodynamic frictional engagement with the first spur wheel (26) disposed thereabove via a radial gap filled with oil.

4. The apparatus of claim 1, characterized in that the additional shaft (46) is coupled with the drive motor (54) so as to rotate therewith and drives the wheel rim (32) and thus the main shaft (22) via a geared link (42, 38).

5. The apparatus of claim 1, characterized in that the additional shaft (46) is driven in shunt with the main shaft (22).

* * * * *